US012748009B2

United States Patent
(12)

Yeon et al.

(10) Patent No.: US 12,748,009 B2

(45) Date of Patent: Sep. 29, 2026

(54) AUTOMATED AND WIRELESS ACCELERATED HEAT TREAT LIFE TESTING SYSTEM

(71) Applicant: UIF (UNIVERSITY INDUSTRY FOUNDATION), YONSEI UNIVERSITY, Seoul (KR)

(72) Inventors: Pyungwoo Yeon, Santa Clara, CA (US); Mingu Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 305 days.

(21) Appl. No.: 18/608,637

(22) Filed: Mar. 18, 2024

(65) Prior Publication Data

US 2025/0189400 A1 Jun. 12, 2025

Related U.S. Application Data

(60) Provisional application No. 63/452,906, filed on Mar. 17, 2023.

(51) Int. Cl.

| | |
|---|---|
| ***G01M 3/16*** | (2006.01) |
| ***G01M 3/18*** | (2006.01) |
| ***G01M 3/40*** | (2006.01) |
| ***G01N 27/22*** | (2006.01) |
| ***G01N 27/24*** | (2006.01) |

(52) U.S. Cl.

CPC ............ *G01M 3/16* (2013.01); *G01N 27/225* (2013.01); *G01N 27/226* (2013.01); *G01N 27/228* (2013.01); *G01M 3/186* (2013.01); *G01M 3/40* (2013.01); *G01N 27/223* (2013.01); *G01N 27/24* (2013.01)

(58) Field of Classification Search

CPC .......... G01M 3/16; G01M 3/186; G01M 3/40; G01N 27/225; G01N 27/226; G01N 27/228; G01N 27/223; G01N 27/24

USPC ........................................................ 73/335.03

See application file for complete search history.

(56) References Cited

U.S. PATENT DOCUMENTS

2017/0184528 A1* 6/2017 Haque .................... H10K 85/20

FOREIGN PATENT DOCUMENTS

KR 10-2023-0153136 A 11/2023

OTHER PUBLICATIONS

P. Escobedo, A. Martinez-Olmos, J. Fernandez-Salmeron, A. Rivadeneyra, L.F. Capitan-Vallvey, A.J. Palma, M.A. Carvajal, "Compact readout system for chipless passive LC tags and its application for humidity monitoring", Jul. 23, 2018, Published in Sensors and Actuators A: Physical, pp. 287-294 (Year: 2018).*

(Continued)

*Primary Examiner* — Peter J Macchiarolo

*Assistant Examiner* — John M Royston

(74) *Attorney, Agent, or Firm* — Studebaker Brackett PLLC

(57) ABSTRACT

Disclosed is an automated and wireless accelerated heat treat life testing system, and the system includes a readout coil; and an LC sensor on the readout coil, wherein the LC sensor includes: a sensing coil; an IDC sensor on the sensing coil; and a humidity sensing layer on a sensing area of the IDC sensor.

11 Claims, 19 Drawing Sheets
(3 of 19 Drawing Sheet(s) Filed in Color)

(56) References Cited

OTHER PUBLICATIONS

F. Molina-Lopez, D. Briand, N.F. de Rooij, "All additive inkjet printed humidity sensors on plastic substrate", Feb. 24, 2012, Published in Sensors and Actuators B: Chemical, pp. 212-222 (Year: 2018).*

* cited by examiner

1920

1930

1940

1950

Before Accelerated Heat Soak Test

AUTOMATED AND WIRELESS ACCELERATED HEAT TREAT LIFE TESTING SYSTEM

CROSS-REFERENCE TO RELATED APPLICATIONS

This application claims benefit of priority to U.S. Provisional Patent Application No. 63/452,906, filed Mar. 17, 2023, the entire content of which is incorporated herein by reference.

BACKGROUND

1. Technical Field

The present disclosure relates to an automated and wireless accelerated heat treat life testing system, and more particularly, relates to an automated and wireless accelerated heat treat life testing system which can monitor a package hermetic failure of an IMD sensor.

2. Description of Related Art

Reliability and lifetime estimation of implantable medical devices (IMDs) is one of the essential steps in their design and development. As any failure (defect or breakdown) of IMDs can result in serious health risks for the patients, they should be guaranteed not to fail over their intended lifetime under the harsh body fluidic and chemical environments. However, the conventional leak tests may be applicable to a limited number of large cm-scale IMDs, and often destructive, laborious, and costly.

Home appliances may face several problems initially or fail toward the end of their life cycle. In today's competitive global market, manufacturers are required to guarantee the functionality and reliability of their products during the user-case product life cycle, depending on the application. In many cases, the product life cycles of implantable medical devices (IMDs) require 10 years or longer in the hostile environment of the human body. The failure mechanisms of IMDs can be categorized into acute and chronic, based on the elapsed time since implantation. Also, the failure mechanisms of IMDs can be biological, mechanical, and material, based on the root causes of failure. The acute failures of IMDs are mostly linked to mechanical failures during handling at production lines or during surgery. These types of failures can often be detected at an early stage before or during surgery with proper visual/optical inspection or nondestructive imaging, such as CT scans or X-rays. By contrast, the chronic failures of IMDs associated with hermetic failure (e.g., material) or tissue response (e.g., biological) around implants are more challenging to detect before the actual functional failures. To enable the long-term monitoring of any biological parameter with IMDs, hermetic packages should act as a barrier to prevent the penetration of ionic biological fluids into the IMDs, which may result in degradation of device performance, electrical failures of IMDs, and hazardous chemical leaks from IMDs into their surrounding tissue. Therefore, the reliability of hermetic IMD encapsulation should be examined before implantation surgery. The conventional methods to test the hermeticity of IMDs include methods to measure the leak rate through hermetic encapsulation, such as the helium, radioisotope, or optical leak tests. Their leak rate requirements are defined in the U.S. MIL-STD-883 Test Method 1014 (e.g., B. Han, Sensors. 2012, 12, 3082; MIL-STD-883F Method 1014.12, Test Method Standard Microcircuits, Department of Defense: Arlington; 2004; Y. Tao, A. P. Malshe, Microelectron. Reliab. 2005, 45, 559). However, the IMDs with volumes of less than 10-3 cm3 cannot be accurately measured using traditional leak rate tests owing to the resolution limits of the equipment (e.g., A. Vanhoestenberghe, N. Donaldson, Artif Organs. 2011, 35, 242; A. Goswami, B. Han, IEEE Trans. Adv. Packag. 2008, 31, 14; A. Goswami A, B. Han, Microelectron. Reliab. 2008, 48, 1815; S. Millar, M. Desmulliez, Sens. Rev. 2009, 29, 339). Furthermore, traditional methods often require destructive, manual, and laborious testing, that involve wire tethering to measurement devices, gas injection into the IMD packages, or pulling a number of devices out of the environmental chambers at every checkpoint.

Recent studies on mm-scale IMDs have aimed at replacing transcutaneous wires and bulky batteries with wireless powering, such as near-field powering with inductive-capacitive (LC) resonators. Such passive LC tanks can facilitate the wireless monitoring of hermetic encapsulation failure by monitoring the resonance frequency with minimal power reflection to an adjacent readout coil in the frequency range of interest. However, this measurement often requires labor-intensive and manual data acquisition using a bulky vector network analyzer (VNA). Accelerated heat soak test is one of the most widely used industry test standards for measuring the durability and lifetime of IMD encapsulation layer. To exacerbate failure symptoms and accelerate aging, IMDs can be placed in an environmental test chamber for either temperature control while being soaked in an ionic solution (e.g., saline) or both temperature/humidity control without being soaked in any solution. However, owing to the limited performance of non-customized readout electronics (e.g., in terms of signal-to-noise ratio and interrogation distance), the automated and wireless hermetic failure tests of mm-scale IMDs under accelerated heat soak conditions have not yet been widely demonstrated.

SUMMARY

An embodiment of the present disclosure is to provide an automated and wireless accelerated heat soak testing system to assess the hermetic failure mechanism of an inductively powered IMD sensor.

In addition, an embodiment of the present disclosure is to provide an automated and wireless accelerated heat soak testing system to evaluate the hermetic failure mechanism of an inductively powered IMD by using a near-field backscattered signal.

Technical problems of the inventive concept are not limited to the technical problems mentioned above, and other technical problems not mentioned will be clearly understood by those skilled in the art from the following description.

In an aspect, an automated and wireless accelerated heat treat life testing system according to the present disclosure may include a readout coil; and an LC sensor on the readout coil, wherein the LC sensor includes: a sensing coil; an IDC sensor on the sensing coil; and a humidity sensing layer on a sensing area of the IDC sensor.

Furthermore, the humidity sensing layer may include magnesium.

Furthermore, the humidity sensing layer may have a thickness of 100 nm.

Furthermore, contact pads of the IDS sensor may be connected to the sensing coil through respective bonding wires.

Furthermore, each of the bonding wires may include aluminum.

Furthermore, the LC sensor may further include an encapsulation layer surrounding the sensing coil, the IDC sensor, and the humidity sensing layer.

Furthermore, the encapsulation layer may include parylene-C.

Furthermore, the encapsulation layer may have a thickness of 4 μm.

Furthermore, the readout coil may have a curved spiral shape.

Furthermore, the sensing coil may have a straight spiral shape.

Furthermore, each of the readout coil and the LC sensor may be provided in plural.

Furthermore, the system may further include a switch for activating a plurality of transmission lines of the plurality of readout coil; a directional coupler connected to the switch; a low-pass filter and a gain/phase detector connected to the directional coupler; a direct digital synthesizer connected to the low-pass filter; and a micro-controller connected to the direct digital synthesizer and the gain/phase detector.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1D is a diagram for describing an electromagnetic simulation presenting power flow to a first readout coil when a switch turns on.

DETAILED DESCRIPTION

Figure 1A:
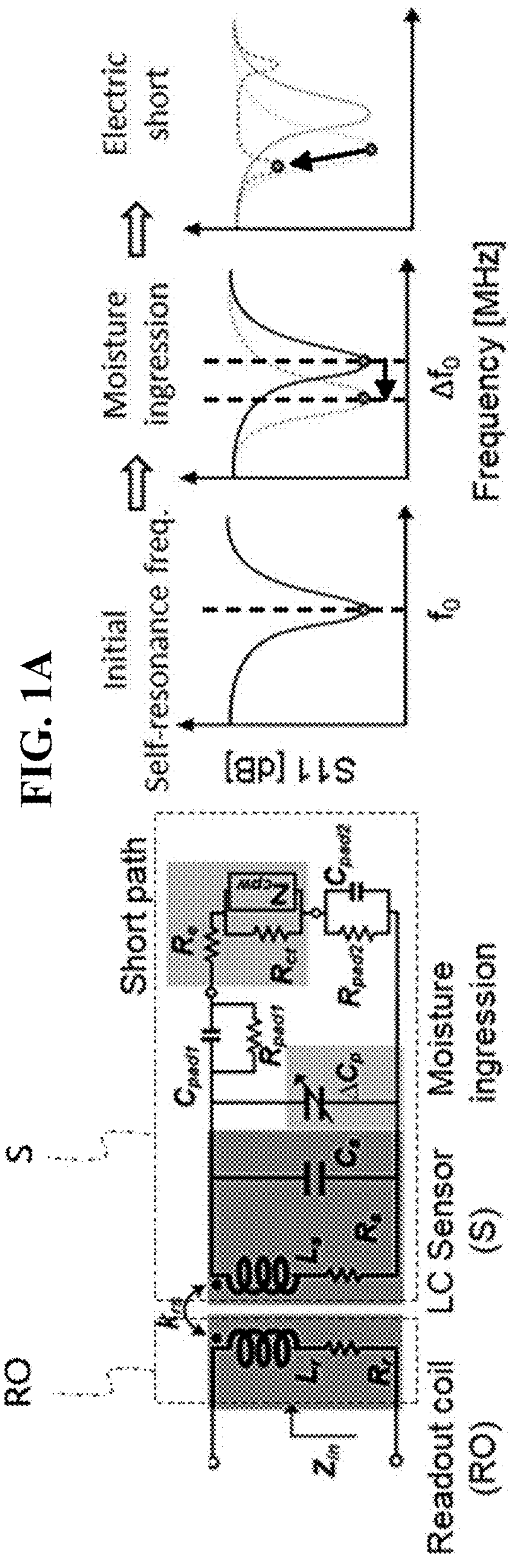
FIG. 1A is a diagram describing a simplified circuit model and operating principle for monitoring the hermetic failure of an IMD sensor through a wireless inductive link.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

Hereinafter, operation principles and embodiments of the present disclosure will be described with reference to the accompanying drawings.

Figure 1B:
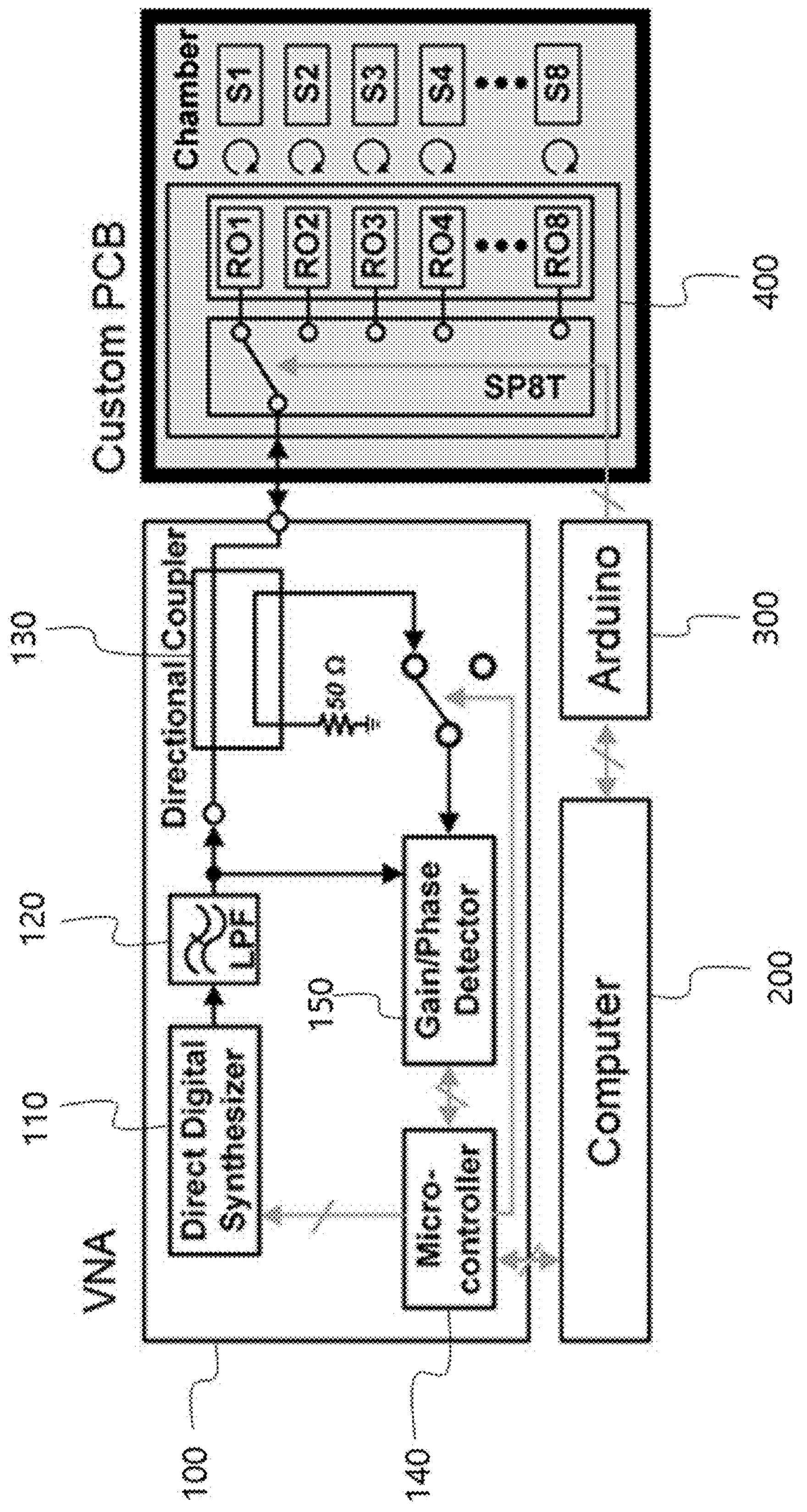
FIG. 1B is a schematic diagram illustrating an automated and wireless accelerated heat treat life testing system according to an embodiment.
Figure 1C:
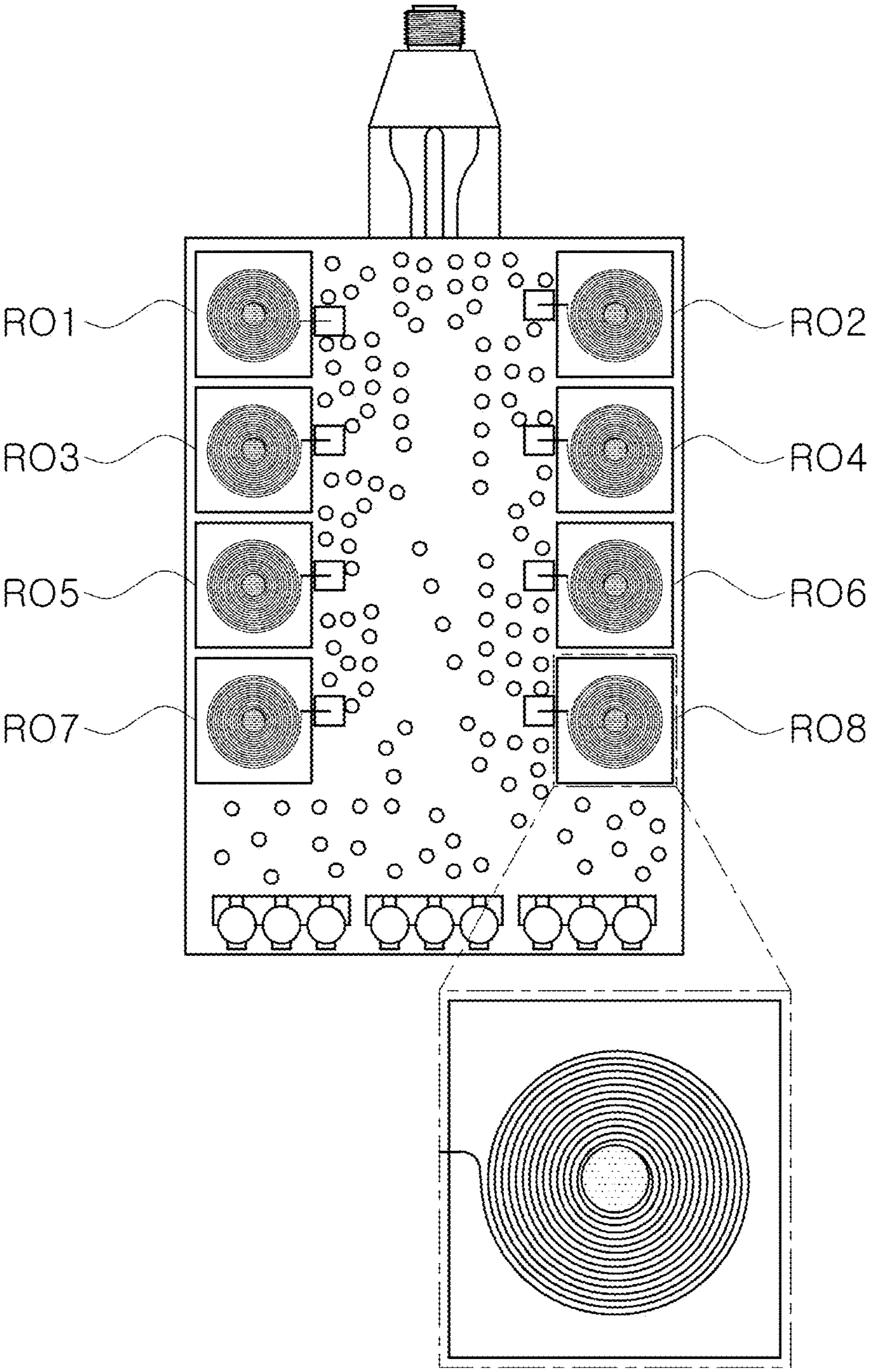
FIG. 1C is a design of a custom FR4-based printed circuit board with eight-channel wireless sensing function.
Figure 1D:
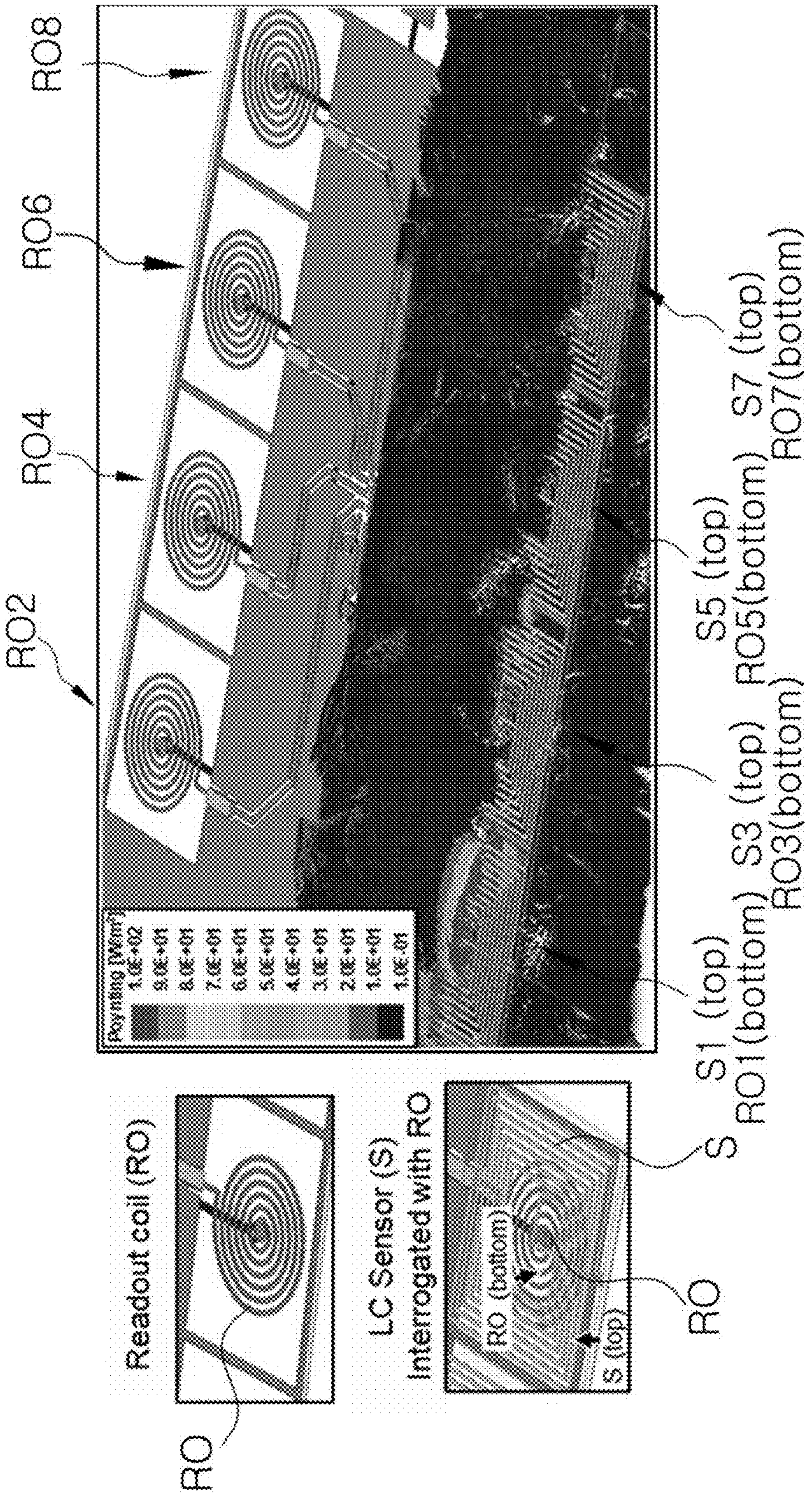
Figure 1E:
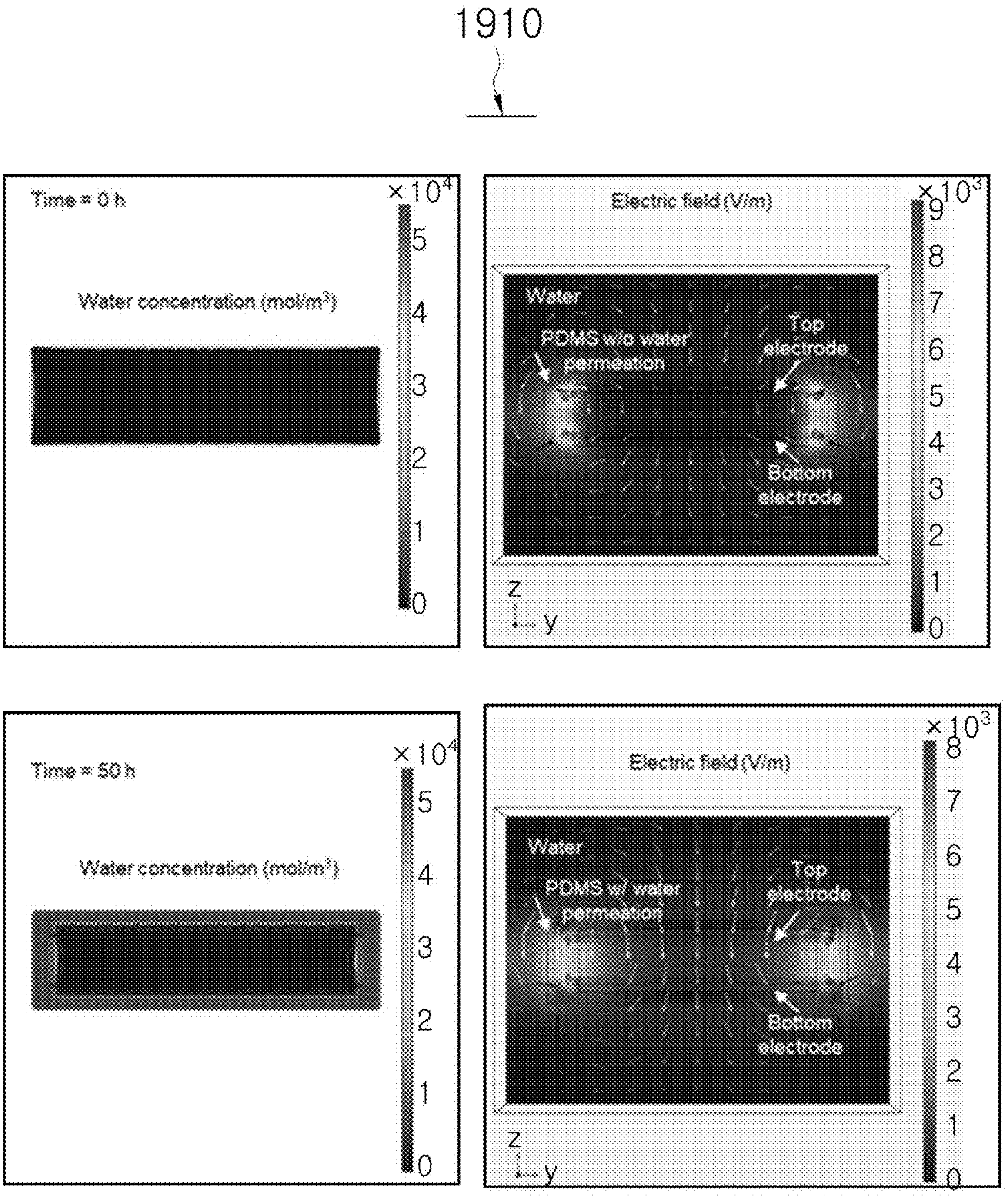
FIG. 1E is a diagram illustrating electrical field simulation with a simple two-ring model and presenting a leakage current flow through moisture ingression into a polymer package.

FIG. 1A is a diagram describing a simplified circuit model and operating principle for monitoring the hermetic failure of an IMD sensor through a wireless inductive link. FIG. 1B is a schematic diagram illustrating an automated and wireless accelerated heat treat life testing system according to an embodiment. FIG. 1C is a design of a custom FR4-based printed circuit board (PCB) with eight-channel wireless sensing function. FIG. 1D is a diagram for describing an electromagnetic simulation presenting power flow to a first readout coil (RO1) when a switch turns on. FIG. 1E is a diagram 1910 illustrating electrical field simulation (COMSOL Multiphysics, Los Angeles, CA, USA) with a simple two-ring model and presenting a leakage current flow through moisture ingression into a polymer package.

A readout coil (e.g., at least one of a first to eighth readout coils; RO1 to RO8) transmits power to a corresponding LC sensor (e.g., at least one of a first to eighth LC sensors; S1 to S8) across the frequency range of interest and tracks the self-resonant frequency (f0). The change in the self-resonant frequency (Af0) of the LC sensor is mainly determined by the capacitance change owing to moisture ingression. Specifically, the self-resonant frequency f0 is determined by Equation 1 below.

$$\frac{1}{2\pi\sqrt{L_s(C_s+\Delta C_p)}} \quad \text{[Equation 1]}$$

In Equation 1 above, Ls represents the inductance (e.g., the inductance of the corresponding LC sensor), Cs represents the original capacitance (e.g., the original capacitance of the corresponding LC sensor (or initial capacitance)), and ΔCp represent the capacitance change owing to the moisture ingression of the LC sensor.

When both exposed pads (modeled as Cpad1-Cpad2 and Rpad1-Rpad2) of Ls are short-circuited through water/liquid polarized ions, the magnetic resonance frequency f0 cannot be monitored within the frequency range of interest because the original capacitance Cs and the capacitance change ΔCp are shunted through the water/liquid leakage path. Here, the shunt path may be modeled with a solution resistance Rs, a constant phase angle impedance ZCPW, and a charge transfer resistance Rct.

The front-end custom FR-4 printed circuit board (PCB) is wirelessly integrated with microfabricated capacitive sensors connected to sensing coils (S1-S8 or LC sensors) in series, shown in FIG. 1E. The custom PCB 400 has eight readout coils RO1-RO8, and their transmission lines may be selectively enabled by a single-pole, eight-throw (SP8T) switch (SKY13418-485LF, Skyworks Inc., Woburn, MA, USA) via an Arduino Uno R3 300 equipped with an ATmega328 microcontroller 140 (Microchip Inc., Chandler, Arizona). The SPOT switch is connected through the custom PCB 400 to a commercial mini VNA (Vector Network Analyzer) 100 unidirectionally transmitting a maximum power of −6 dBm via a direct digital synthesizer 110 and directional coupler pipeline within a selected frequency range controlled through a computer graphic user interface (GUI). The backscattered power from a selected ROx (e.g., the first to eighth readout coils; RO1 to RO8) inductively coupled with an Sx (e.g., the first to eighth LC sensors (or the first to eighth sensing sensors; S1 to S8)) is sampled through the directional coupler 130, and its gain and phase are monitored using a gain/phase detector 150. The recorded data are stored in a.csv file every few minutes and processed using MATLAB code to determine the resonant frequency of S1-S8 and plot it in the time domain.

Meanwhile, the direct digital synthesizer 110 and the directional coupler 130 may be electrically connected with each other through a low-pass filter 120. Furthermore, the microcontroller 140 and Arduino 300 may be electrically connected with each other through a computer 200.

According to an embodiment, the custom eight-channel readout coil array is designed to optimize power transmission and reflection (in the form of S-parameters) toward obtaining six-turn bonding-wire wound coils of size 1.3×1.3 $mm^2$ by the publicly known design procedure. The microfabricated interdigitated capacitive (IDC) sensor is used as a humidity-sensing module 1800 in the package for a better quantification of moisture ingression into 4 μm thick the encapsulation layer 720 (e.g., parylene-C encapsulation). The design and fabrication details are discussed below.

An electromagnetic simulation model is constructed as shown in FIG. 1D using the high-frequency structural simulator (HFSS, ANSYS, Canonsburg, PA) to validate the power delivery through an activated ROx (e.g., an activated readout coil among the first to eighth readout coils; RO1 to RO8) RF (e.g., resonance frequency or self-resonance frequency) trace to an Sx (e.g., one corresponding to ROx among the first to eighth LC sensors (or the first to eighth sensing sensors; S1 to S8)) (including isolation between RO1-RO8 traces inductively coupled with S1-S8).

With 0 dBm inserted into the input of the SP8T switch, the isolation for the deactivated channels is either −37 dBm to the second to sixth readout coils RO2-RO6 or −31 dBm to the seventh and eighth readout coils RO7-RO8. Their Poynting vectors are limited to less than 1 W $m^{-2}$, whereas the maximum Poynting vector for the activated ROx reached 100 W $m^{-2}$.

Figure 2A:
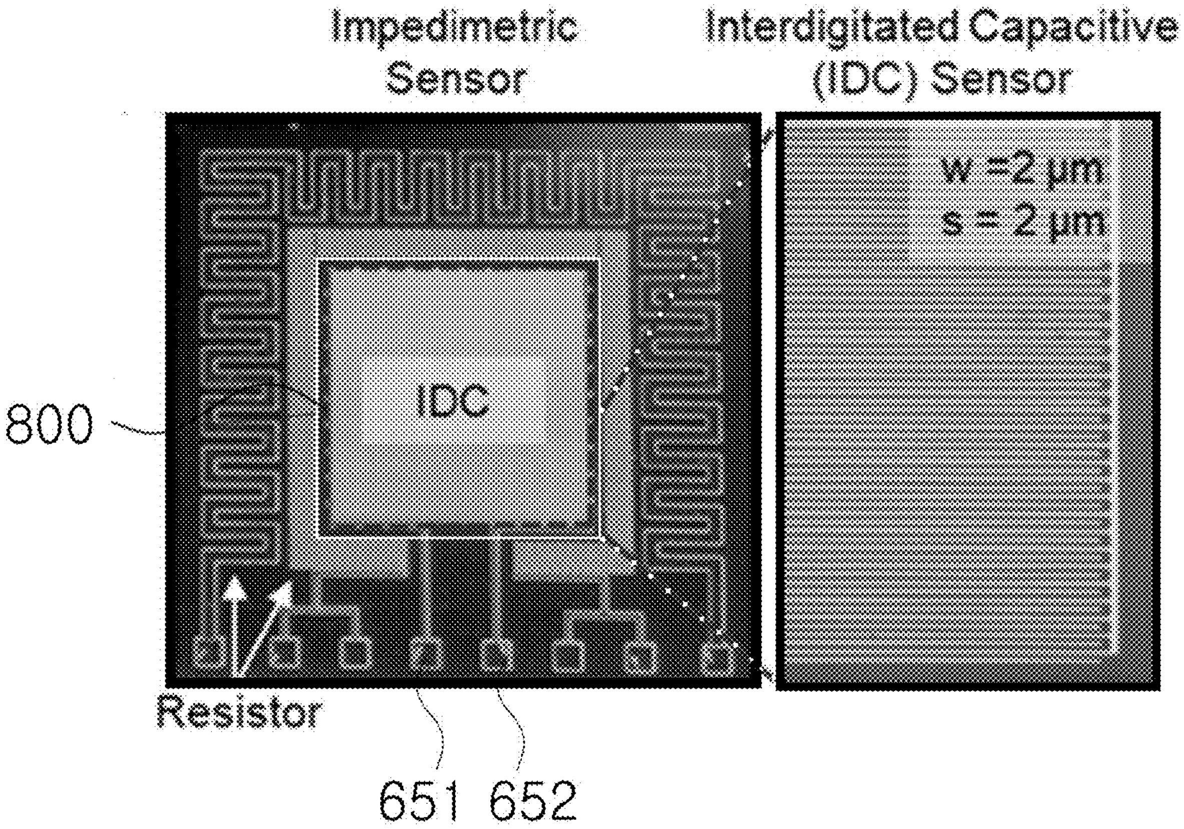
FIG. 2A is a diagram illustrating the fabricated IDC sensor.
Figure 2B:
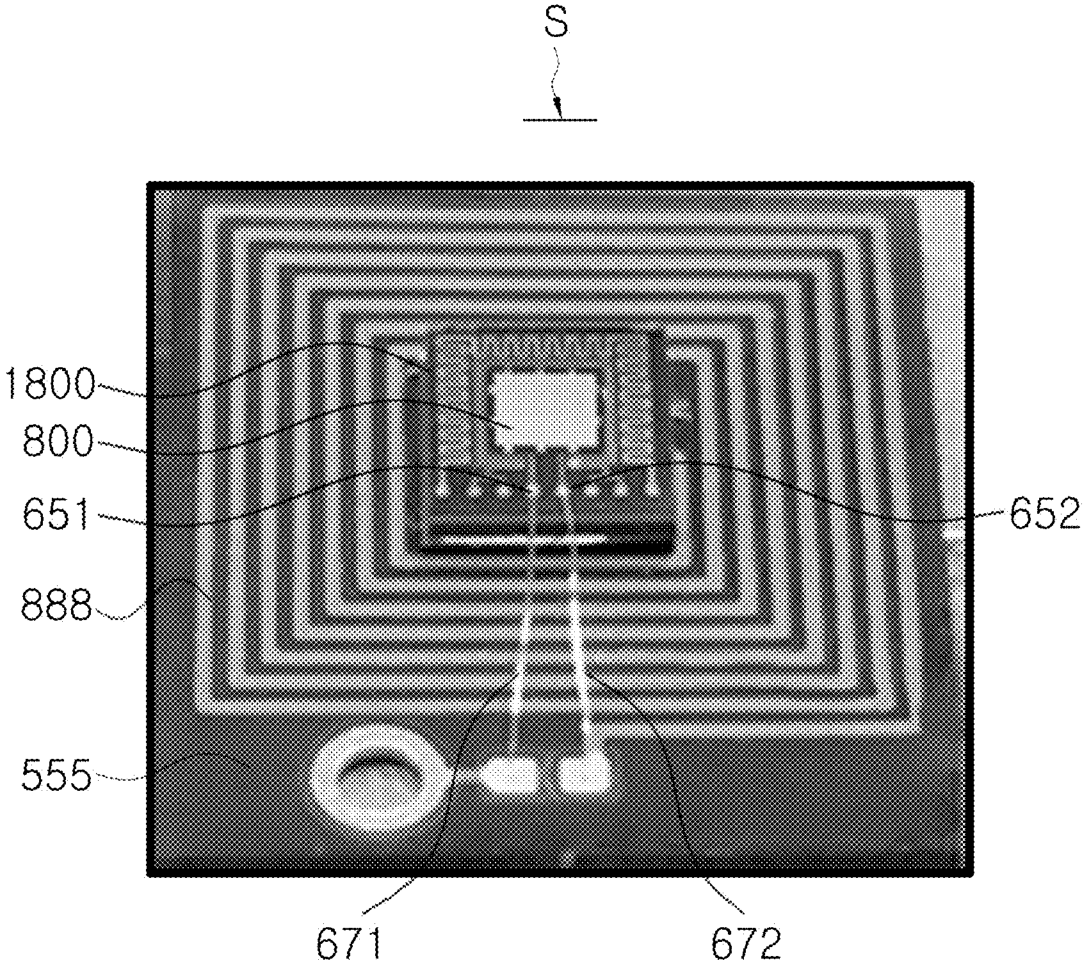
FIG. 2B is a diagram illustrating an optical image of the sensing coil connected to the IDC sensor through Al bonding wires to form the LC sensor.
Figure 2C:
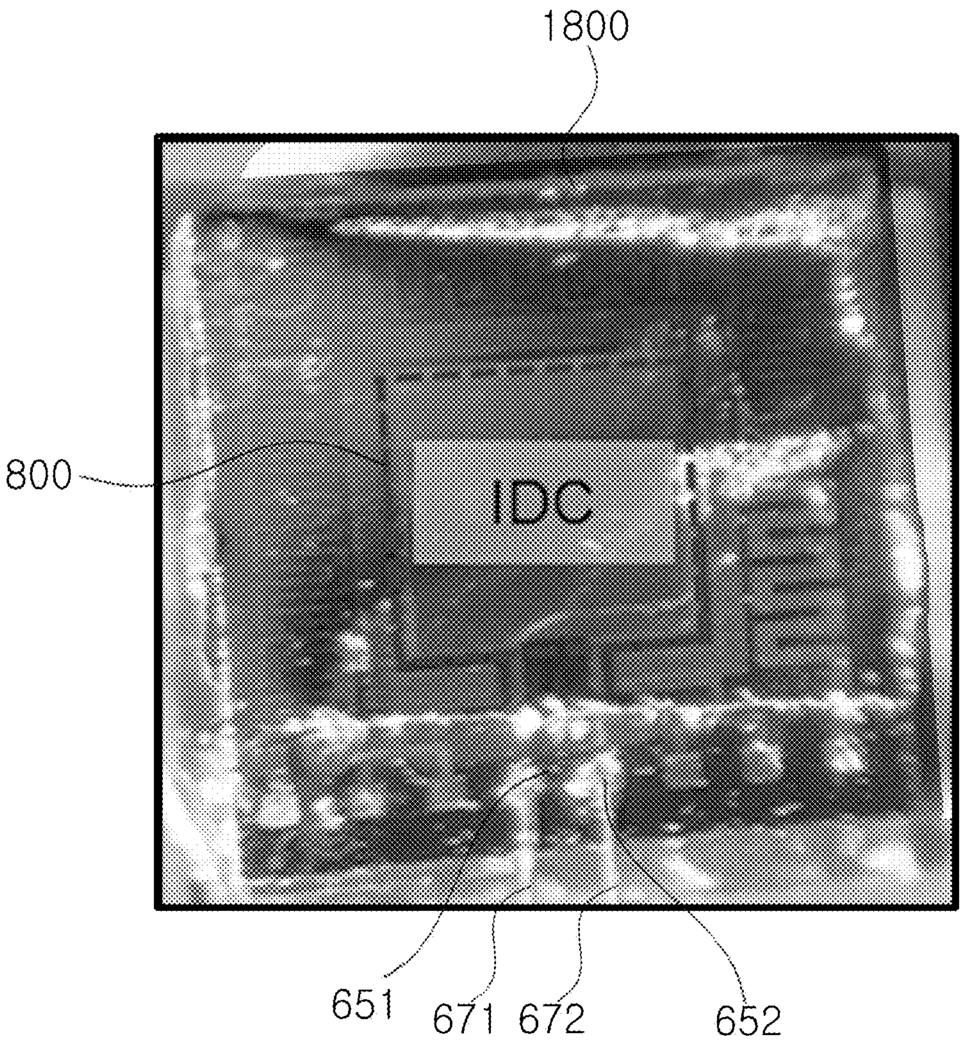
FIG. 2C is a diagram illustrating an optical image of the IDC sensor including Mg coating.
Figure 2D:
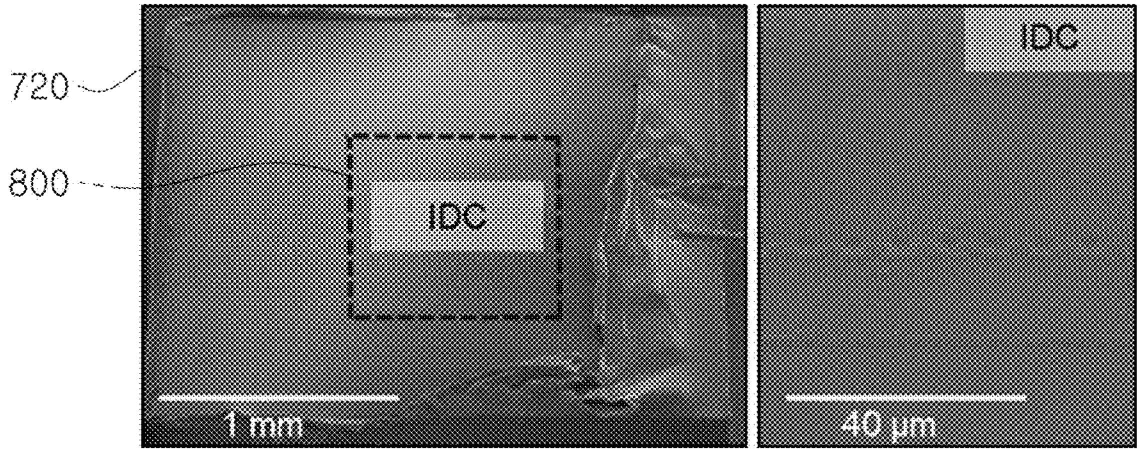
FIG. 2D is a diagram illustrating an SEM (Scanning Electron Microscope) image of the IDC sensor coated with 4 μm thick parylene-C encapsulation layer.
Figure 2E:
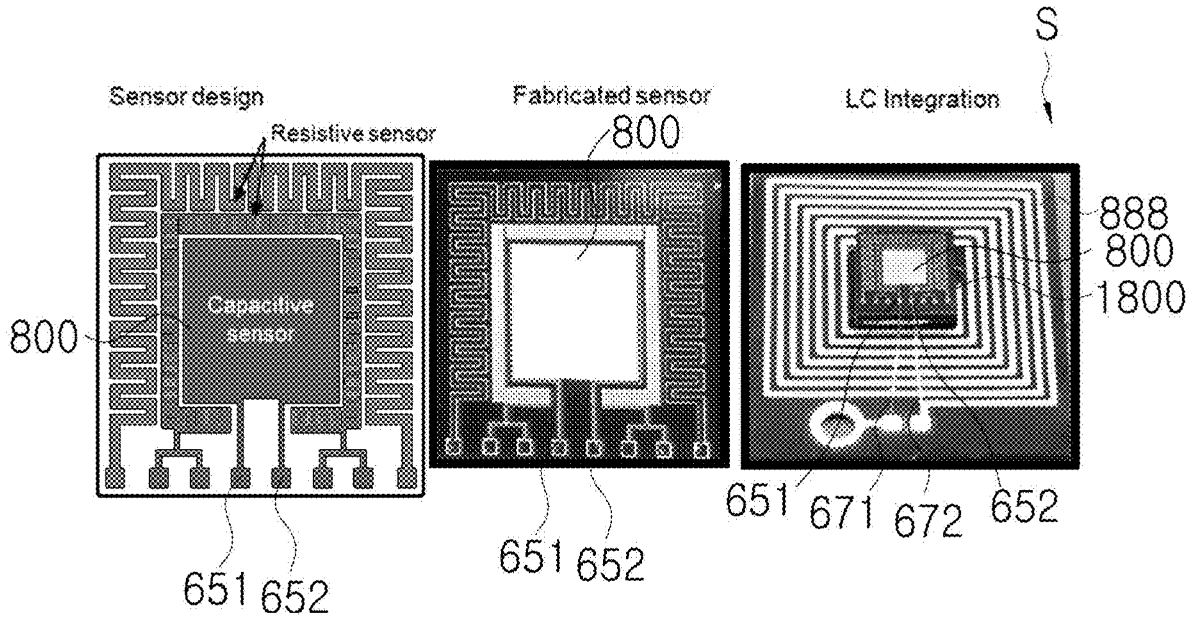
FIG. 2E is a diagram illustrating an impedance sensor design, and images of a fabricated IDC sensor and an integrated LC sensor.
Figure 2F:
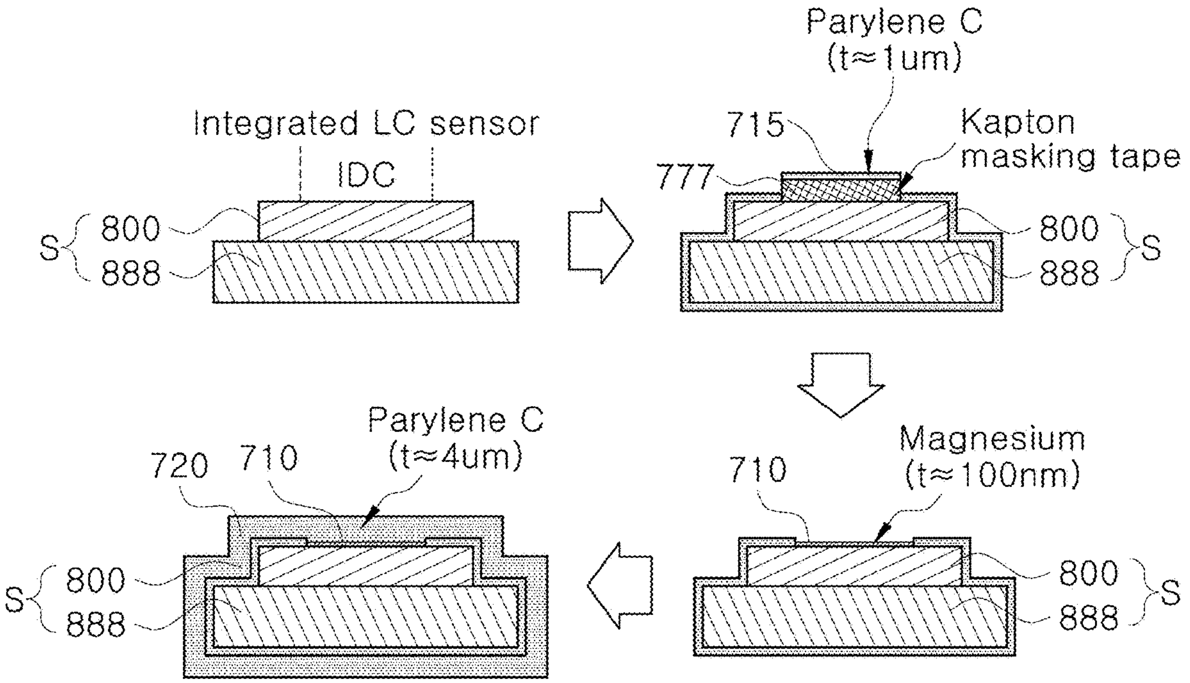
FIG. 2F are fabricating sectional diagrams of a sealed encapsulation for monitoring moisture ingression.

FIG. 2A is a diagram illustrating the fabricated IDC sensor 800. FIG. 2B is a diagram illustrating an optical image of the sensing coil 888 connected to the IDC sensor 800 through Al bonding wires 671 and 672 to form the LC sensor S. FIG. 2C is a diagram illustrating an optical image of the IDC sensor 800 (e.g., IDC humidity sensor) including Mg coating 710. FIG. 2D is a diagram illustrating an SEM (Scanning Electron Microscope) image of the IDC sensor 800 coated with 4 μm thick parylene-C encapsulation layer 720. FIG. 2E is a diagram illustrating an impedance sensor design, and images of a fabricated IDC sensor 800 and an integrated LC sensor S. FIG. 2F are fabricating sectional diagrams of a sealed encapsulation for monitoring moisture ingression.

As shown in FIG. 2A and FIG. 2E, a 1×1 $mm^2$ IDC sensor 800 with a width and spacing of 2 μm is utilized to assess the hermetic failure mechanism. A capacitor type sensor located at the center of the fabricated impedimetric sensor 800 is selected to form the LC integration. The initial capacitance (Cs) of the IDC sensor 800 is about 3.15 pF. When saline fully covers the IDC sensor 800, the capacitance increases to greater than 5 pF because of its high relative permittivity (er). The IDC sensor 800 is fabricated on a Si wafer of diameter 100 mm and thickness 500 μm with a thermally grown oxide layer. Then, a 200 nm thick aluminum metal layer is deposited via electron-beam evaporation, and the IDC electrodes are patterned using standard photolithography and a dry etching process. Finally, a $SiO_2$ layer passivation is deposited using atomic layer deposition (ALD).

To form the series LC resonator (e.g., S), two exposed contact pads 651 and 652 of the fabricated IDC 800 are electrically connected to the two ends of an eight-turn sensing coil 888 through aluminum bonding wires 671 and 672, as shown in FIG. 2B and FIG. 2E. The sensing coil traces with a width and spacing of 150 μm are printed on a flexible polyimide substrate of size 8.7×7.7 $mm^2$ and thickness 102.6 μm. A thin Mg layer 710 is deposited as a moisture sensing layer to locate moisture ingression paths on the IDC sensor 800. Thereafter, as shown in FIG. 2C and FIG. 2F, the LC sensor S is sealed with a 4 μm thick parylene-C encapsulation layer. The moisture ingression may be visually inspected through changes in color because the deposited Mg layer 710 reacts with condensed moisture to form magnesium oxide (MgO). The IDC sensing area is first masked with a masking tape 777 (e.g., Kapton tape), and the entire integrated LC resonating sensor S is conformally coated with a 1 μm thick parylene-C layer 715 via vapor deposition (SCS Labcoater 2 PDS 2010, Specialty Coating Systems, Indianapolis, IN, USA). This prevents the deposition of magnesium (Mg) layer 710 from creating electrical shorts on the sensor. Afterward, the masking tape 777 is peeled off from the IDC sensing area, and a 100 nm thick Mg layer 710 is sputter-coated onto the IDC sensor 800 (Kurt J. Lesker Company). For example, the Mg layer 710 is disposed on the IDC sensing area. Finally, the LC sensor S is sealed with an additional 4 μm thick parylene-C layer 720.

Figure 3A:
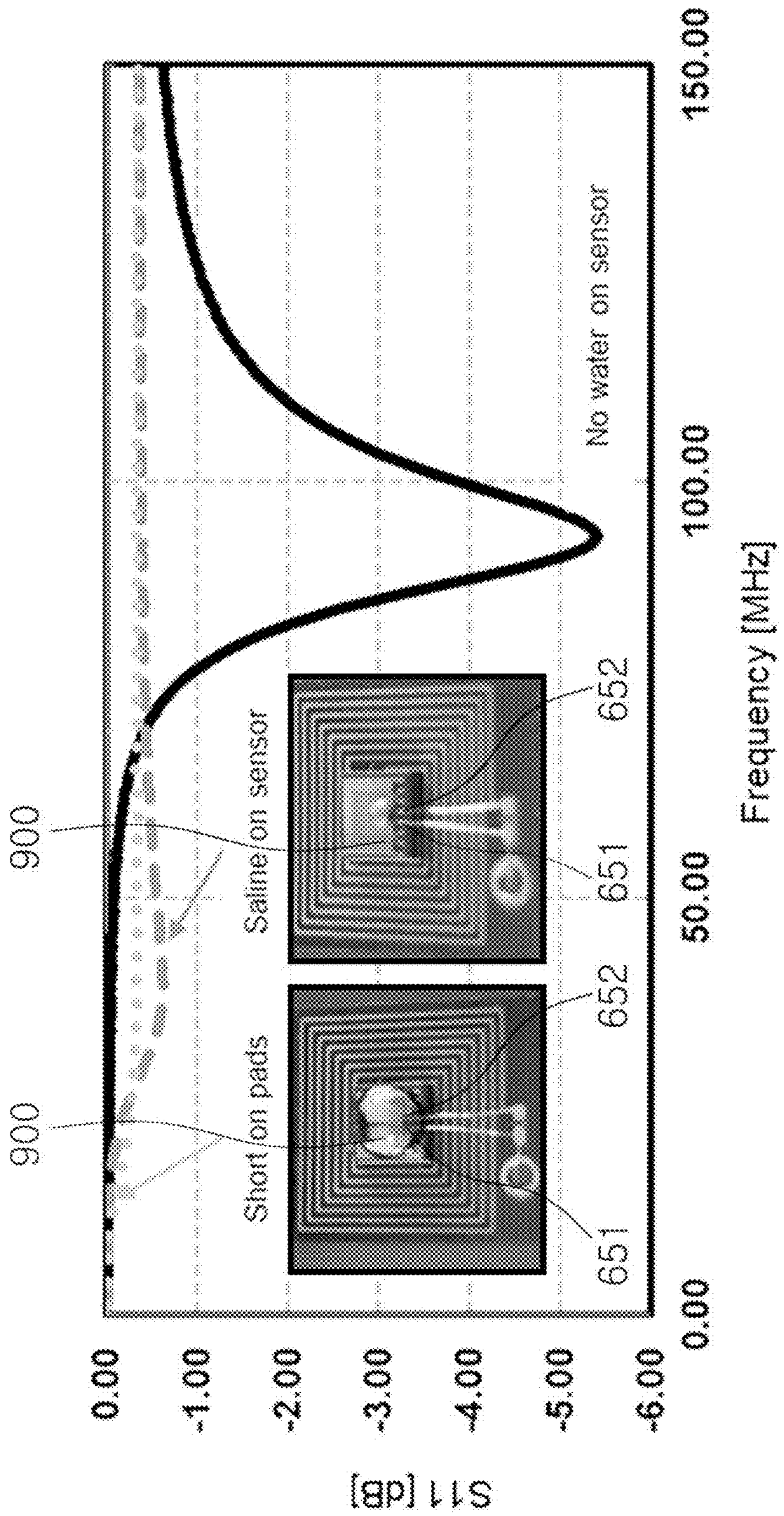
FIG. 3A is a graph illustrating a measured S11 versus frequency in air, with saline on the sensor, and with an electrical short on the exposed pads through saline.
Figure 3B:
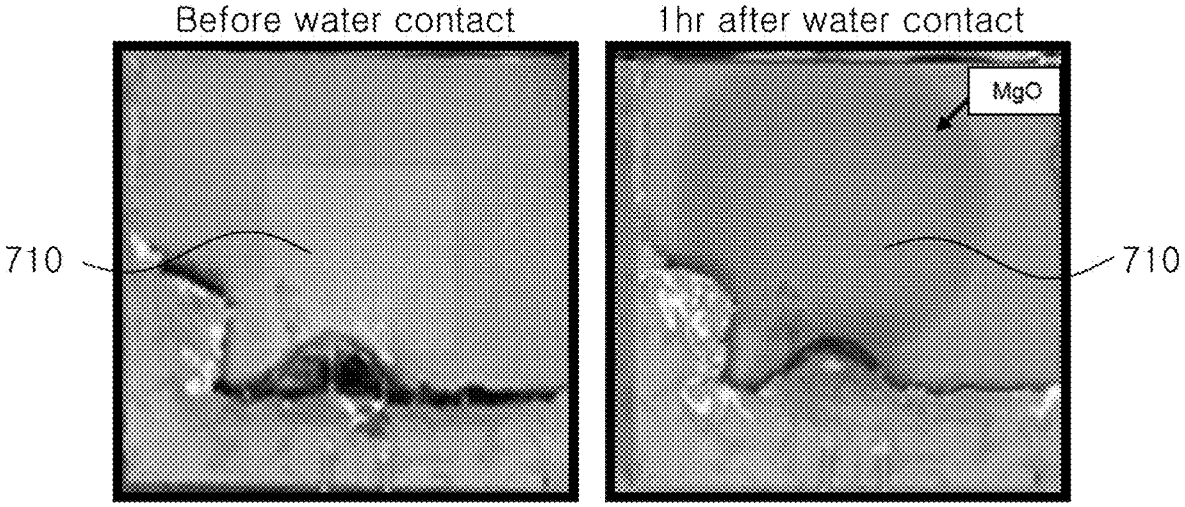
FIG. 3B is a diagram a visual inspection image before and 1 hour after saline contact on the magnesium layer of the sample.

FIG. 3A is a graph illustrating a measured S11 versus frequency in air, with saline 900 on the sensor, and with an electrical short on the exposed pads 651 and 652 through saline 900. FIG. 3B is a diagram a visual inspection image before and 1 hour after saline contact on the magnesium layer 710 of the sample.

To analyze the failure rate of the IMD sensor 800, their functionality or specific electrical parameters, such as impedance, may be measured. In particular, hermetic failure for wirelessly powered IMDs through near-field inductive links may be measured by monitoring the backscattered signal impacted by dielectric constant change or electrical short from moisture ingression into the package. To validate the hermetic failure measurement method, the following two simple tests may be performed.

1) S11 measurement across the frequency of interest with and without saline 900 on the uncoated IDC sensor 800 (refer to FIG. 3A), and
2) visual inspection of the sensor coated with the magnesium layer 710 before and after saline 900 contact (refer to FIG. 3B).

To validate the first test methodology, the ΔCp value of the IDC sensor 800 from saline 900 contact on the sensing area is in directly monitored through Af0 seen from a single-loop rectangular readout coil 888 (8×8 mm$^2$), which is connected to an E5071B VNA (Agilent Technologies, Santa Clara, CA, USA). As shown in FIG. 3A, the resonance frequency f0 is measured at 93.4 MHz without any saline 900 contact on the IDC sensor 800, whereas the minimum S11 is −5.41 dB with near zero sensor to-readout interrogation distance. When a small drop of saline 900 covers the lower half region of the IDC sensor 800, the resonant frequency (f0) becomes 39.7 MHz, and the S11 parameter is −0.63 dB. When saline 900 covers the entire IDC sensor 800, touches the exposed pads 651 and 652 on the IDC sensor 800, and creates an electrically short path, the minimum peak of S11 disappears, and the resonant frequency f0 may not be measured because the LC sensor S no longer resonates.

The 100 nm thick magnesium layer 710 sputter-coated onto the IDC sensor 800 may contact the saline 900 and may be changed to magnesium oxide (MgO). In this case, the magnesium oxide (MgO) layer has a different color to the magnesium layer 710. Accordingly, the color change of the magnesium layer 710 may indicate the moisture ingression into the encapsulation layer. In other words, the magnesium layer 710 may indicate the moisture ingression path into the encapsulation layer. To validate this second hermetic test methodology, it is visually inspected a sample before and 1 hour after saline 900 contact with the magnesium layer 710 (see FIG. 3B). As shown in the right-hand side image of FIG. 3B, a darker spot in the middle of the sample is observed 1 hour after a small drop of saline 900 is placed on the magnesium layer 710.

Figure 4A:
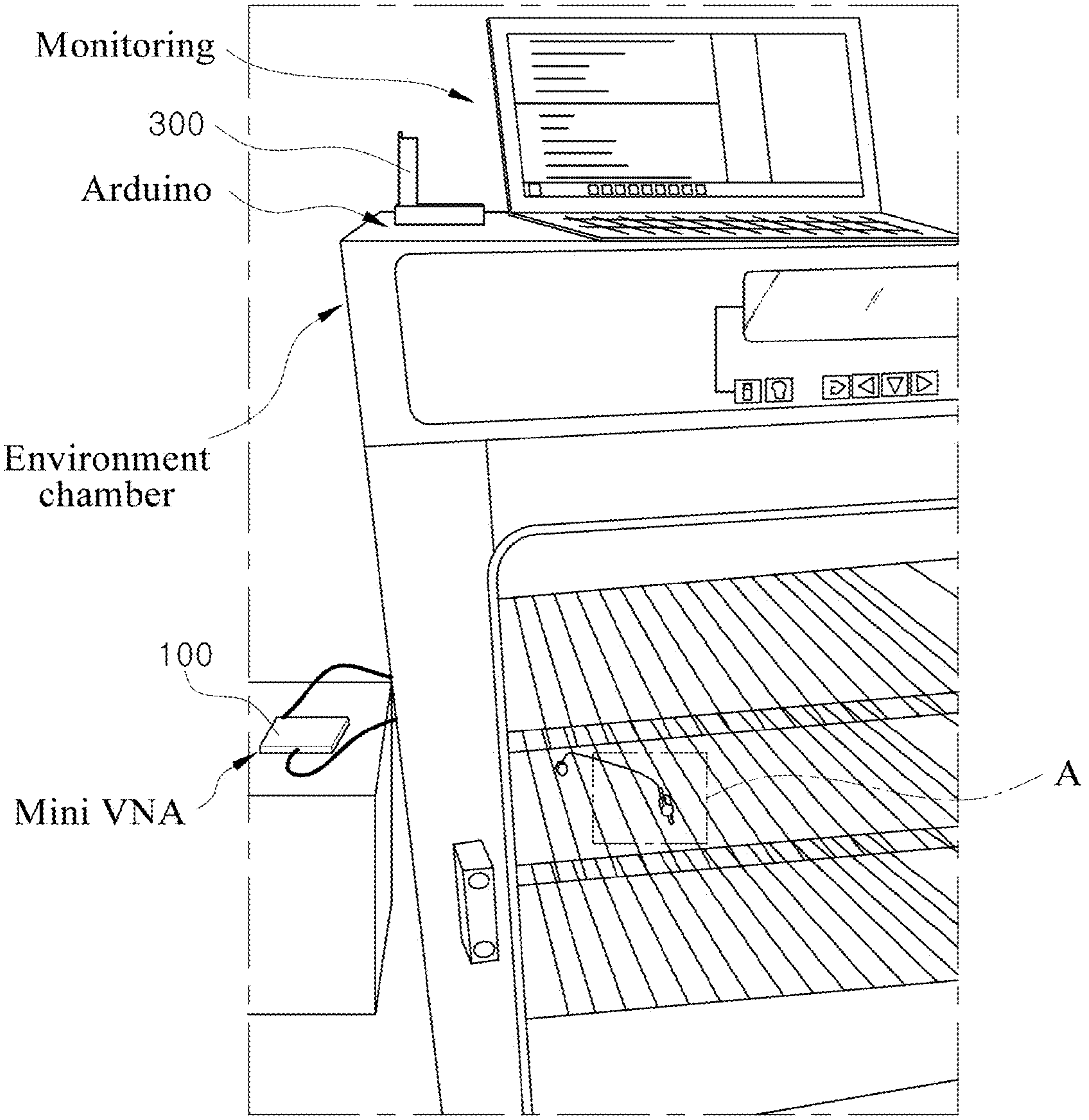
FIG. 4A is a diagram illustrating an automated and wireless accelerated heat soak testing system according to an embodiment.
Figure 4B:
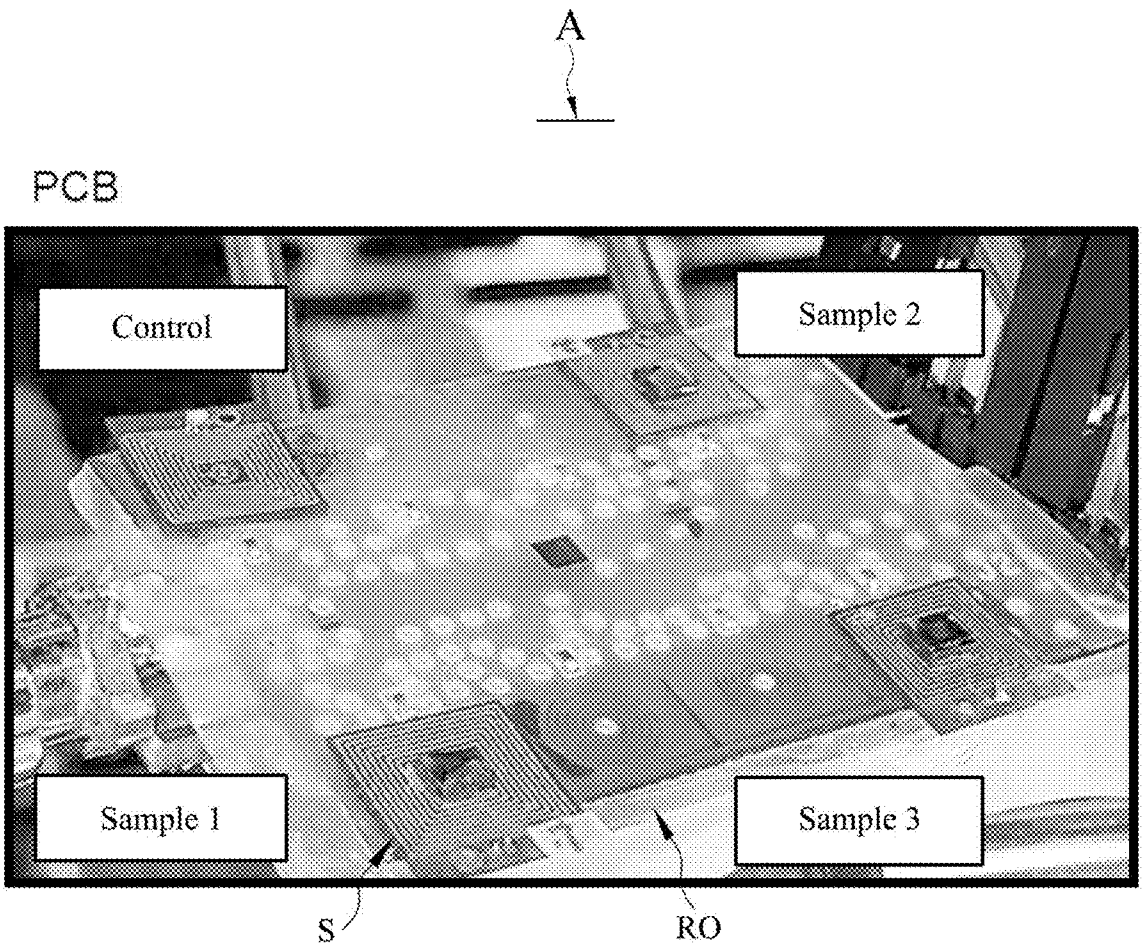
FIG. 4B is a diagram illustrating a FR-4-based custom eight-channel readout coil array sealed with a paraffin film.
Figure 4C:
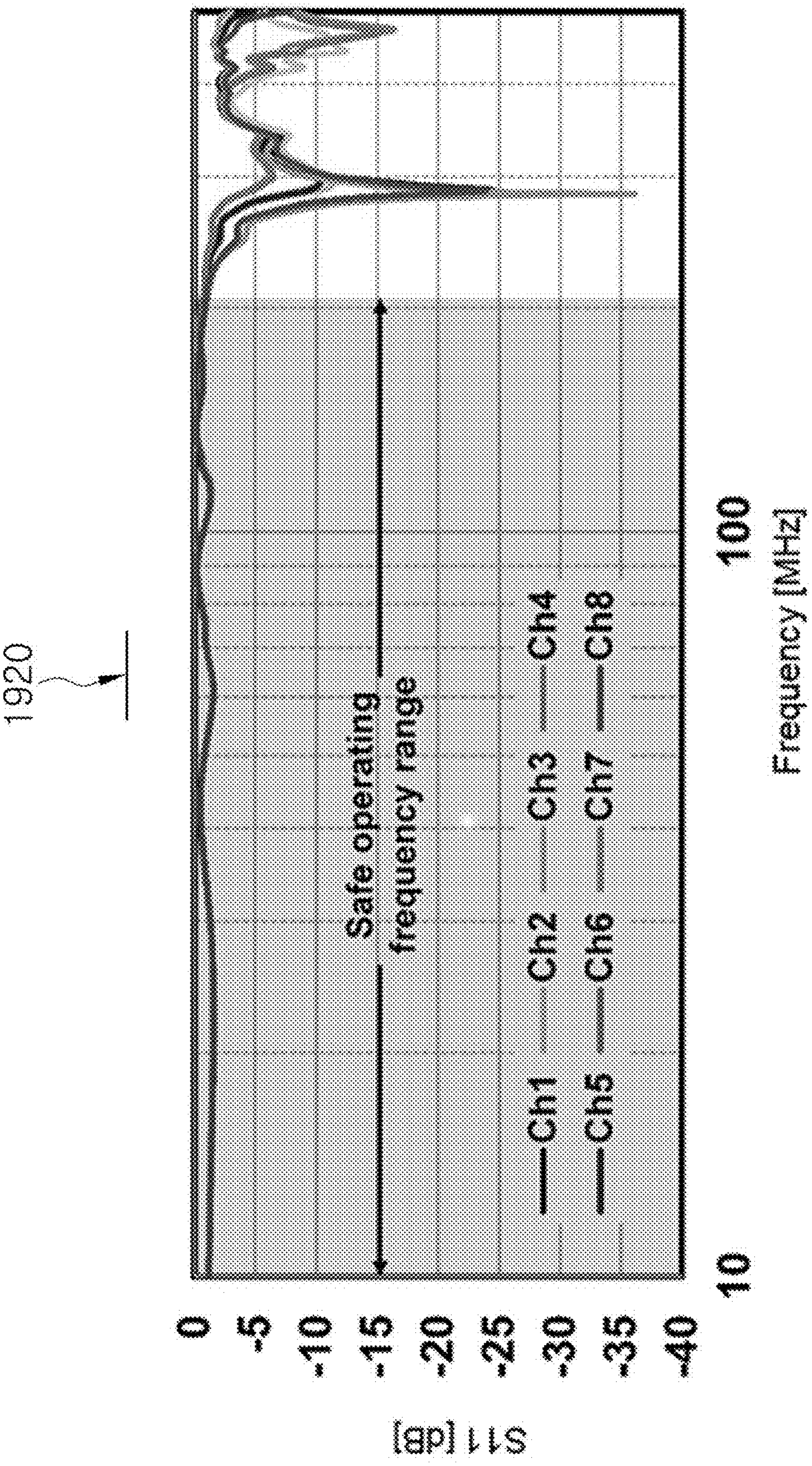
FIG. 4C is a graph illustrating the measurement of a baseline for frequency for each of channels on the designed PCB.
Figure 4D:
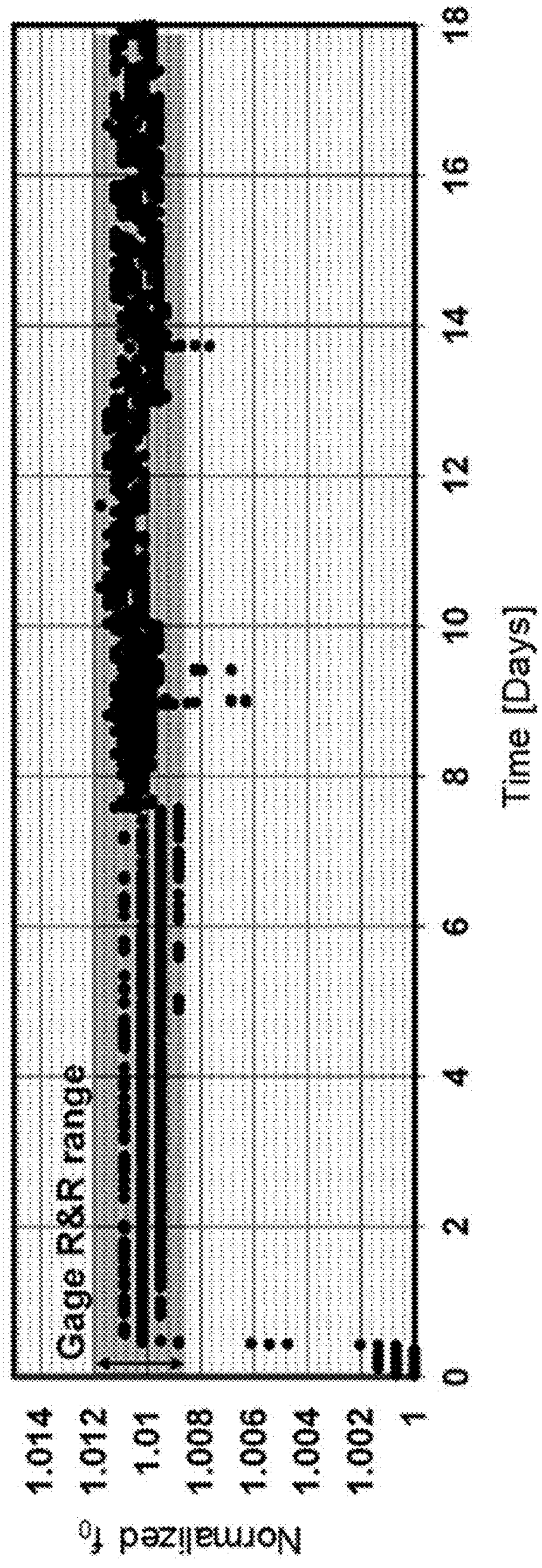
FIG. 4D is a diagram for describing Gage R&R testing with a sample in air at 45° C./90% RH.
Figure 4E:
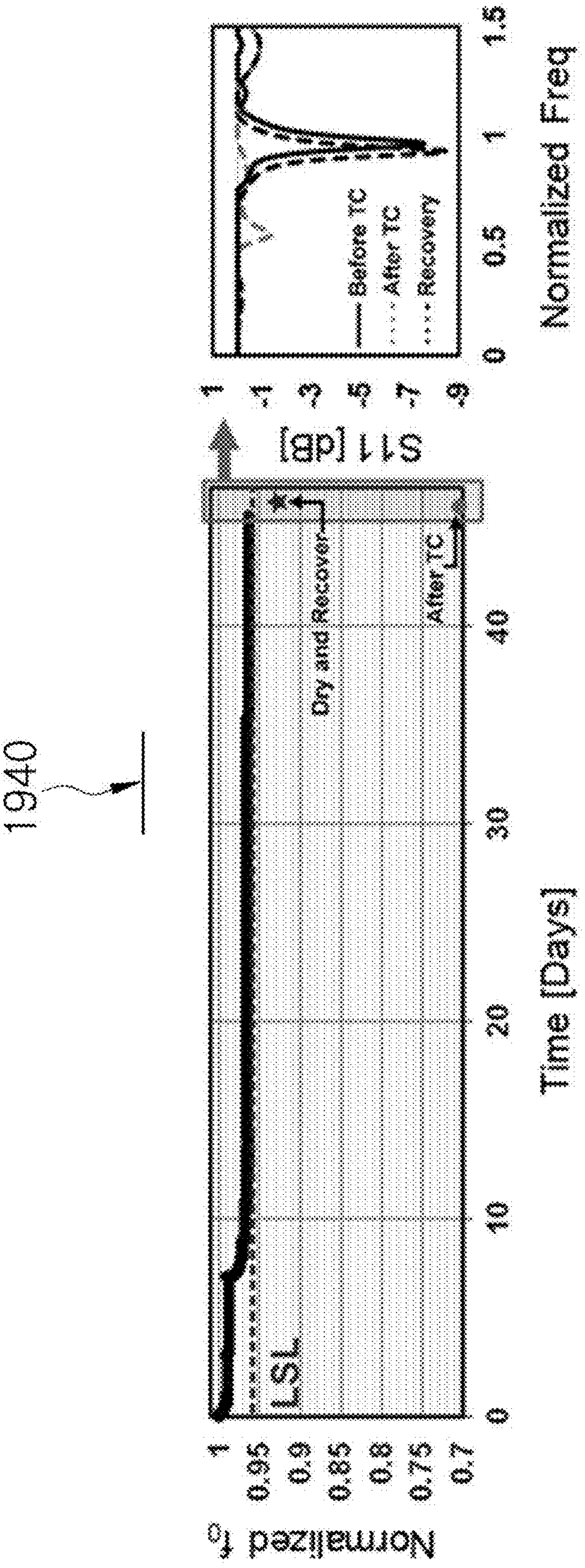
FIG. 4E is a diagram illustrating the normalized resonance frequency f0 of a failed sample during accelerated testing for 45 days at 45° C./90% RH.

FIG. 4A is a diagram illustrating an automated and wireless accelerated heat soak testing system according to an embodiment. FIG. 4B is a diagram illustrating a FR-4-based custom eight-channel readout coil array sealed with a paraffin film. For example, FIG. 4B is an enlarged diagram for the A part shown in FIG. 4A. FIG. 4C is a graph (1920) illustrating the measurement of S11 baseline for frequency for each of channel #1-8 on the designed PCB. FIG. 4D is a diagram (1930) for describing Gage R&R testing with a sample in air at 45° C./90% RH. FIG. 4E is a diagram (1940) illustrating the normalized resonance frequency f0 of a failed sample during accelerated testing for 45 days at 45° C./90% RH.

Additional thermal cycling at 90° C. for 12 hour is performed at the end of the accelerated testing.

Figure 5A:
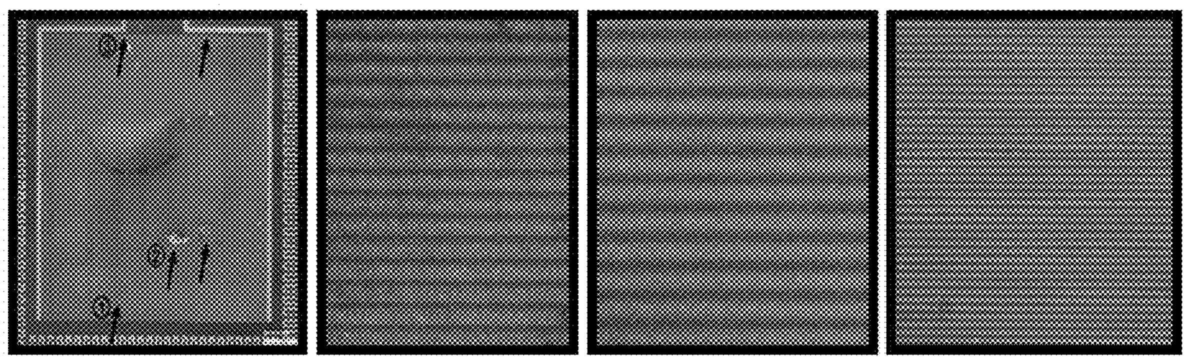
FIG. 5A and FIG. 5B are diagrams illustrating visual inspection images at locations #1, #2, and #3 of the IDC sensor coated with 4 μm thick parylene-C layer.
Figure 5B:
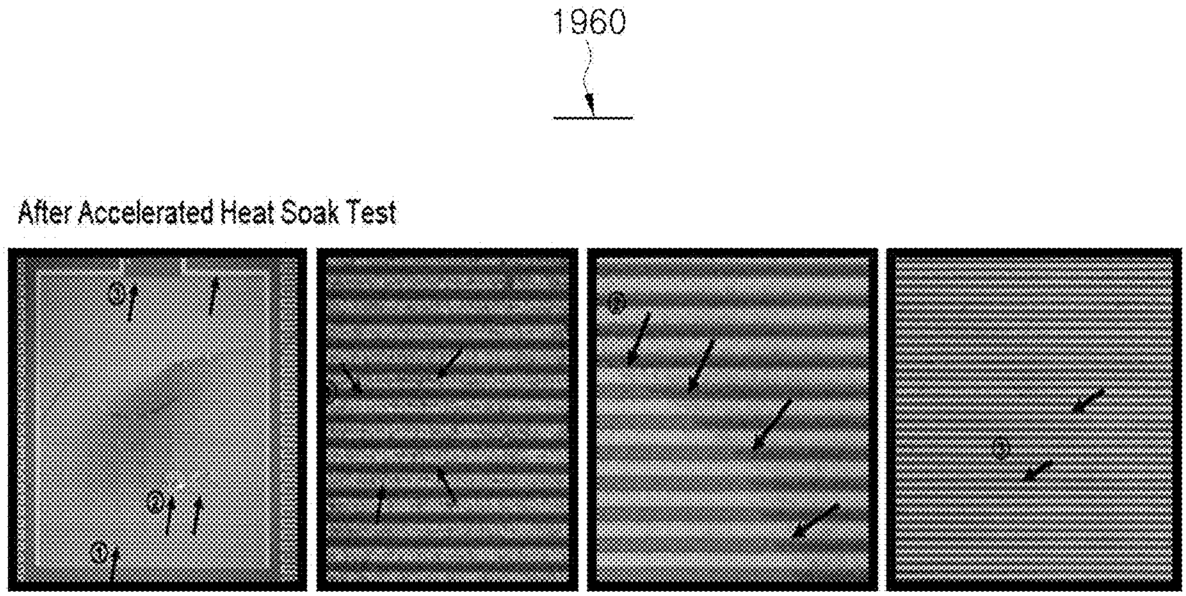

FIG. 5A and FIG. 5B are diagrams illustrating visual inspection images at locations #1, #2, and #3 of the IDC sensor coated with 4 μm thick parylene-C layer. For example, FIG. 5A is a diagram (1950) illustrating a visual inspection image before soaking the sample in a phosphate-buffered saline bath, and FIG. 5B is a diagram (1960) illustrating a visual inspection image after soaking the sample in a phosphate-buffered saline bath at 90° C. for 12 hour after accelerated heat soak testing for 45 days at 45° C./90% RH.

According to an embodiment, an automated and wireless accelerated heat soak testing system is provided to monitor moisture ingression into hermetic or near-hermetic packages of up to eight inductively powered IMDs.

According to an embodiment, by determining the change in the resonant frequency of an LC tank for IMDs, a nondestructive and continuous (or persistent) hermetic failure examination under accelerated conditions may be achieved without directly tethering a wire to devices, forcing gases into the package, or pulling the device out from environmental chambers at every check point.

For the mock-up inductively powered IMD samples, seven LC sensor samples is provided along with one control sample. The LC sensor sample of size 8.7×7.7 mm$^2$ on a 102.6 μm thick flexible polyimide substrate 555 has a 1×1 mm$^2$ microfabricated IDC sensor deposited with magnesium for the visual inspection of moisture ingression into a 4 μm thick parylene-C encapsulation layer. The system may monitor the f0 value of IMDs in the frequency range of 1 to 200 MHz with an error range of ±0.2%, which is validated via a gage R&R test for 19 days at 1 atm, 90% RH, and 45° C.

Through accelerated testing for 45 days with seven LC sensor samples in comparison with one control sample, one out of the seven LC sensor samples showed downshifted f0 by 3.5% near the lower specification limit.

After 12 hour of thermal cycling of the IDC sensor 800 in a saline bath at 90° C., it is confirmed that moisture ingression into the parylene-C encapsulation layer 720 by observing magnesium layer 710 oxidation on the IDC sensor 800, and it is measured that f0 downshift by 25% with minimum S11 degradation. The system according to an embodiment may examine either physical or material induced encapsulation failures of wireless IMDs as small as 1.3×1.3 mm$^2$. Furthermore, this system along with the IDC integrated LC sensors S provides a proof-of-concept for early nondestructive manufacturing quality check by sampling or annualized failure rate calculation through targeted reliability testing for broader consumer electronics not limited to wireless IMDs.

Fabrication of IDC sensor 800 and Inductor-Capacitor Integration: The IDC sensor 800 is fabricated on a Si wafer of diameter 100 mm and thickness 500 μm in the following order: growing 1 μm thick thermal oxide, depositing a 200 nm thick Al metal layer by electron-beam evaporation, patterning the IDC using standard photolithography and dry etching, and finally depositing a $SiO_2$ passivation film via ALD. The fabricated linewidth and spacing of the IDC were both 2 μm. The fabricated IDC capacitor was interconnected in series to form an inductor-capacitor configuration. The fabricated IDC sensor 800 is electrically connected to an eight-turn sensing coil 888 through aluminum bonding wires 671 and 672. The sensing coil traces with the width and spacing of 150 mm are printed on a flexible polyimide substrate 555 of size 8.7×7.7 $mm^2$ and thickness 102.6 m.

Electrical Characterization and Simulation: The electrical characterization of the LC sensors is performed using a VNA (E5071B, Agilent Technologies, Santa Clara, CA, USA) and customized PCB readout coils with a commercial mini VNA. The electrical simulations are performed using COMSOL Multiphysics (Los Angeles, CA, USA) and an HFSS (ANSYS, Canonsburg, PA, USA).

Hermetic Failure and Accelerated Heat Soak Test: A constant temperature and humidity incubator (HWS-70B, Huanghua Faithful Instrument Co., Ltd) is used to maintain the heat- and humidity-controlled environment and thermal/humidity cycling. In addition to the electrical measurements, images obtained via inspection using an optical microscope are compared before and after thermal cycling.

According to the present disclosure, the high-throughput readout coil array printed circuit board (PCB) may test hermeticity of multiple mm-sized wireless IMDs simultaneously in a harsh environment (e.g., 45° C./90% RH with an error range of ±0.2% for 18 days gage repeatability and reproducibility test). The accelerated heat soak test is performed to evaluate the electronic durability and estimate the lifetime of the IMDs. This work focuses on validating the proposed system interrogating with eight inductor-capacitor sensors. The inductor-capacitor sensor includes an interdigitated capacitive sensor connected to an inductor patterned polyimide substrate. The inductor-capacitor sensor examines hermetic failure mechanisms of parylene-C encapsulation layer for wireless IMDs as well as broader miniature-sized consumer electronics.

According to the present disclosure, the custom-made eight-channel readout coil array is designed, simulated, and characterized for the nondestructive hermetic encapsulation failure monitoring of multiple IMDs without laborious manual operations.

According to the present disclosure, the magnesium-deposited capacitive sensor is integrated with an inductor to form an LC tank, which is used for identifying the hermetic failure mechanism and locations of moisture ingression.

In addition, according to the present disclosure, the accelerated heat soak test is performed to evaluate the electronic durability and estimate the lifetime of the IMDs.

Technical effects of the inventive concept are not limited to the technical effects mentioned above, and other technical effects not mentioned will be clearly understood by those skilled in the art from the following description.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

What is claimed is:

1. An automated and wireless accelerated heat treat life testing system, comprising:

a readout coil; and an LC sensor on the readout coil, wherein the LC sensor includes:

a sensing coil;

an IDC sensor on the sensing coil; and a humidity sensing layer on a sensing area of the IDC sensor, wherein contact pads of the IDC sensor is connected to the sensing coil through respective bonding wires.

2. The system of claim 1, wherein the humidity sensing layer includes a material that reacts with magnesium or moisture.

3. The system of claim 1, wherein the humidity sensing layer has a thickness of 100 nm.

4. The system of claim 1, wherein each of the bonding wires include aluminum.

5. The system of claim 1, wherein the LC sensor further includes an encapsulation layer surrounding the sensing coil, the IDC sensor, and the humidity sensing layer.

6. The system of claim 5, wherein the encapsulation layer includes parylene-C or encapsulation materials.

7. The system of claim 5, wherein the encapsulation layer has a thickness of 4 μm or hundreds of nm to several μm.

8. The system of claim 1, wherein the readout coil has a curved spiral shape.

9. The system of claim 1, wherein the sensing coil has a straight spiral shape.

10. The system of claim 1, wherein each of the readout coil and the LC sensor are provided in plural.

11. The system of claim 10, further comprising:

a switch for activating a plurality of transmission lines of the plurality of readout coil;

a directional coupler connected to the switch;

a low-pass filter and a gain/phase detector connected to the directional coupler;

a direct digital synthesizer connected to the low-pass filter; and a micro-controller connected to the direct digital synthesizer and the gain/phase detector.

* * * * *